United States Patent Office 3,027,754
Patented Apr. 3, 1962

3,027,754
LEAK DETECTING METHOD AND COMPOSITION FOR FUEL SYSTEMS
Henry E. Alquist and Harold C. Walters, Bartlesville, Okla., assignors to Phillips Petroleum Company, a corporation of Delaware
No Drawing. Filed June 24, 1955, Ser. No. 517,894
24 Claims. (Cl. 73—40.7)

This invention relates to an improved method for detecting leaks. In one aspect it relates to an improved method for detecting leaks in liquid containers, especially fuel systems. In another aspect it relates to a novel leak detecting fluid having a high flash point and desirable detecting properties. In another aspect it relates to a method for detecting leaks in an aircraft powerplant fuel injection system and fuel tanks.

Various compositions, methods and procedures have either been proposed or used in the past to detect leaks in pipes, fittings, conduits, valves, tanks and reservoirs containing gases, liquids, etc. Several procedures that have been utilized in the past to detect a leak in a system involve the application of fluid pressure thereto and determining from a decline in the pressure whether or not a leak exists, or by observing visually the loss of the test fluid through a leak. The leak detecting fluids used in the past for finding leaks in an aircraft powerplant fuel injection system and fuel tanks have a very low flash point, and consequently are very hazardous to use around an airfield or maintenance depot. Aviation gasoline has been used for this purpose but its use means that leak testing is confined to the ramp area after the aircraft has been overhauled. The objection to this procedure is that the repair of a leak detected at this point in the overhaul schedule involves considerable additional work and expense. Therefore, it is obvious that a less hazardous and more practical leak detecting fluid is needed for testing aircraft powerplant fuel injection systems and aircraft fuel tanks.

The ideal leak detecting fluid is not burned in the aircraft powerplant but is merely introduced in the fuel system so that the combustion properties of the leak testing fluid are important only to an extent dependent on the degree of contamination of the engine fuel resulting from incomplete purging. In addition, the ideal leak detecting fluid should have a high flash point and low toxicity so that the fluid is not dangerous to use, and it should have a surface tension not greater than 200 percent, preferably 150 percent, and more preferably substantially the same as, or less than, the surface tension of the fuel which it represents. Also, the ideal leak testing fluid should preferably have a low value of vapor pressure in order that large quantities of the testing fluid are not lost by evaporation. The ideal leak testing fluid should preferably meet the normal requirements of freezing point, gum content, and corrosivity of the fuel which the detecting fluid represents; however, these are of lesser importance and are not absolutely essential.

It has now been found that certain highly branched chain hydrocarbons, preferably mixtures thereof, having a high flash point and certain other physical properties useful in aiding the detection of leaks can be advantageously employed in leak testing liquid containers, especially fuel systems. These novel leak detecting fluids fulfill to a great extent the above mentioned ideal requirements.

Accordingly, it is an object of this invention to provide a safe, convenient, and accurate method of detecting leaks in liquid containers, especially fuel systems.

Another object is to provide a non-hazardous method for detecting leaks in aircraft powerplant fuel injection systems and fuel tanks.

Another object is to provide a novel leak detecting composition having a high flash point.

A further object is to provide a novel leak detecting composition having a readily detectable odor.

A still further object is to provide a novel fluorescent leak detecting composition that can be readily detected visually.

Other objects, advantages, and features will become apparent to one skilled in the art from the following disclosure, discussion and the appended claims.

We have found a less hazardous method for detecting leaks in fuel systems and, accordingly, employ as novel leak detecting compositions certain highly branched chain hydrocarbons, preferably mixtures thereof, containing from 10 to 20 carbon atoms, at least two of which are tertiary or quaternary carbon atoms, having a high flash point, and essentially odorless. Generally, the mixtures of branched chain hydrocarbons useful in the practice of this invention are those boiling in the range of 335° to 550° F., preferably in the range of 335° to 450° F., and having a minimum flash point of 100° F., preferably 125° F. The novel leak detecting compositions of the present invention contain a minimum of 90 percent branched chain hydrocarbons by weight and are substantially completely saturated. As impurities they contain predominately straight chain saturated hydrocarbons. Typical highly-branched chain hydrocarbons which may comprise said fractions include: 3,3-diethylhexane, 2,2,3,3-tetramethylheptane, 2,4,5,7-tetramethyloctane, 4,5-diisopropyloctane, 3,3,4,4-tetramethylhexane, 2,3,7-trimethyloctane, 2,6-dimethyl-3-isopropylheptane, 2,6,11,15-tetramethylhexadecane, and the like. These materials can be obtained from any suitable source. Convenient methods for their preparation include alkylation of isoparaffins with monoolefins using such catalysts as hydrogen fluoride, aluminum chloride, sulfuric acid, or the like. Representative branched chain hydrocarbon mixtures, designated by the trade name Soltrol, are set forth in Table I. The Soltrols are substantially odorless alkylates and have a high flash point, good anti-knock characteristics, and in general are in general are similar to aviation gasoline. They are obtained by hydrogen fluoride alkylation of isoparaffins with monoolefins. The branched chain hydrocarbons can also be obtained by sulfuric acid alkylation, or any other suitable alkylation process.

TABLE I

*Representative Branched Chain Hydrocarbon Mixtures Suitable as Leak Detecting Compositions*

| Specification | Soltrol 130 | Soltrol 150 | Soltrol 170 |
|---|---|---|---|
| Boiling Range (°F.) | 335–410 | 350–445 | 420–475 |
| Flash Point (°F.) | 133 | 140 | 190 |

The leak detecting compositions of the present invention should have a surface tension not greater than 200 percent, preferably 150 percent, and more preferably substantially equal to or less than the surface tension of the fuel which is to be ultimately used in the fuel system. In those instances where these novel compositions are to be employed in detecting leaks in aircraft fuel systems, and where these compositions will be introduced in various fuel conduits, tanks, and the like, the surface tension of these compositions can be adjusted to simulate that of aviation gasoline. The branched chain hydrocarbons of the present invention generally have a surface tension greater than aviation gasoline, however, they are less volatile than aviation gasoline, and can be employed in some instances to detect leaks without adjusting the surface tension. A representative branched chain hydrocarbon fraction, known as Soltrol 130 and boiling in the range of 335° to 410° F., has a surface tension of 25 dynes/cm., while aviation gasoline generally has a surface tension of 17–20 dynes/cm. However, while the surface tension of Soltrol 130 is about 150 percent greater than aviation gasoline, it may be employed to detect leaks without adjusting the surface tension, particularly where the aviation gasoline is unable to detect leaks because of its volatility. That is, aviation gasoline which passes through some leaks often is not detected because it volatilizes before it is detected. Where surface tension is an important criterion, those leak testing compositions of the present invention which have surface tensions higher than that of the fuel they simulate accordingly may be adjusted by the incorporation of a suitable surface active agent therewith. Suitable surface active agents useful in the practice of this invention include the fatty acid esters of anhydrosorbitols which have been solubilized by etherifying the free hydroxyl groups with ethylene oxide, such as "Tween 40," a polyoxyalkylene ether of partial palmitic acid ester made by the Atlas Powder Co.; and the anhydrosorbitol esters which have not been etherified, such as "Span 80," a sorbitan monooleate, also made by the above firm; and oleic acid itself; and the like. The amount of surface active agent to be employed will be sufficient to adjust the surface tension of the leak detecting composition to a value substantially equal to, or less than, that of the fuel which it represents. It is obvious, of course, that in some applications the leak detecting compositions of the present invention will perform satisfactorily their detecting function without the necessity of incorporating a surface active agent therewith. For example, certain aircraft engines such as jet and gas turbine engines burn fuels which have a higher surface tension than that of the leak detecting compositions of the present invention, and consequently the surface tension need not be adjusted, particularly since they will detect those leaks in the fuel system which will not leak these particular fuels.

We have found that in detecting leaks in certain fuel systems and under certain conditions, that it is particularly advantageous to incorporate in our novel leak detecting compositions, certain odoriferous materials to aid detection, particularly where the branched chain hydrocarbon fraction employed is odorless. For example, where visual observation of leaks is not entirely satisfactory because the exterior of the conduit or tank is wet, or the light is poor, etc., the leak may be advantageously detected by the presence of an odor characteristic of the leak detecting composition being employed. Suitable odoriferous material useful in the practice of this invention which may be employed for this purpose include the organic sulfides and preferably organic mercaptans, such as methyl mercaptan, ethyl mercaptan, propyl mercaptan, butyl mercaptan, ethyl sulfide, propyl sulfide, butyl sulfide, and the like. These odoriferous materials can be added directly to the branched chain hydrocarbons, or blended with a suitable solvent and then added. They can be added either alone or in mixtures. It is obvious that the amount of odoriferous material employed will be dependent on various factors among which are the odoriferous compound itself, the particular branched chain hydrocarbons employed, the fuel system to be tested, and the conditions under which the test is to be conducted. Generally, the amount employed will be sufficient to impart an odor intense enough to enable detection but insufficient to endanger health.

Also, we have discovered that because of certain inherent limitations imposed by the conditions under which the leak detecting tests are conducted, such as wet exterior portions of the fuel system being tested, poorly lighted conduits, etc., it is advantageous to incorporate certain fluorescent materials with our novel leak detecting compositions. Upon escaping through a leak in the fuel system, the branched chain hydrocarbons containing fluorescent material can be detected with the aid of simple ultraviolet lamp, or other similar supplemental means. Fluorescent agents suitable in the practice of this invention include those oil-soluble dyes commonly used for imparting fluorescense to lubricating oils and gasoline, and the like, such as "Fluorescent Green Dye H. W. 185%," "Fluorescent Green Dyes C. H. 185%," and "Lube Oil Red H. W. 5050," all made by Wilmont and Cassidy, and "Fluoroleum Red," made by DuPont, and fluorescein or resorcinolphthalein. The amount of fluorescent agent to be incorporated with our novel leak detecting compositions will of course be dependent upon various factors obvious to those skilled in the art by performing simple routine tests.

Soltrol 130, a representative leak detecting composition of the instant invention, was employed for the testing of leaks in the fuel injection systems and fuel tanks of several aircraft reciprocating power plants. Soltrol 130 was introduced into the fuel tanks of the aircraft and the transfer pumps in the fuel tanks were used to circulate and introduced Soltrol 130 in other parts of the fuel system, e.g., the fuel injection system, with the leak detecting composition. Leaks which went undetected when aviation gasoline was present in the fuel system were readily detected when this gasoline was replaced with Soltrol 130. The leaks became detectable soon after the leak detecting composition came into contact therewith. Generally, these leaks were usually detectable within 20 minutes to 8 hours after the fuel system was filled with the leak detecting fluid. After leaks were detected, the Soltrol 130 was withdrawn from the fuel system and the leaks which were observed were repaired. The Soltrol 130 used in one testing procedure was reused for testing other aircraft power plant fuel systems. This example illustrates the applicability of the instant invention to the testing for leaks in aircraft power plant fuel injection systems and fuel tanks particularly since the testing need not be confined to the ramp area, thus reducing the work and expense of the overhaul schedule. This representative example illustrates the applicability of our novel leak detecting compositions per se but it should be understood that surface active agents, fluorescent dyes, and odoriferous material can be added to the branched chain hydrocarbon mixture.

While the present invention has been described as being primarily applicable for detecting leaks in fuel systems for aircraft which normally employ aviation gasoline as a fuel, namely reciprocating aircraft power plants, it is to be understood that the leak detecting fluid of the present invention is also applicable to other aircraft fuel systems. These include the fuel systems which are used for turboprop, turbojet, and other jet engines, or any other power plant requiring a safe leak detecting fluid.

While specific examples have been given for illustrative purposes the invention is obviously not limited thereto and it is within the scope of this invention to employ a leak detecting fluid characterized by all or some of the detective properties given in the above specific examples.

Having disclosed our invention, we claim:

1. A method of safely detecing leaks in a liquid container which comprises, in combination, the steps of introducing in said container in lieu of the liquid normally contained in said container a liquid mixture of branched chain hydrocarbons having a minimum flash point of 100° F. and a boiling range of 335° to 550° F., and inspecting the exterior surfaces of said container for the purpose of detecting leaks therein.

2. A method of safely detecting leaks in a fuel system which comprises, in combination, the steps of introducing in said system in lieu of the fuel normally contained in said system a liquid mixture of branched chain hydrocarbons having a minimum flash point of 100° F. and a boiling range of 335°–550° F., and inspecting the exterior surfaces of said system for the purpose of detecting leaks therein.

3. A method of safely detecting leaks in a fuel system which comprises, in combination, the steps of introducing in said system in lieu of the fuel normally contained in said system a liquid mixture of branched chain hydrocarbons having a minimum flash point of 100° F., a boiling range of 335° to 550° F., and a surface tension not more than 200 percent of the surface tension of said fuel, and inspecting the exterior surfaces of said system for the purpose of detecting leaks therein.

4. A method of safely detecting leaks in a fuel system which comprises, in combination, the steps of introducing in said system in lieu of the fuel normally contained in said system a liquid mixture of branched chain hydrocarbons having a minimum flash point of 100° F., a boiling range of 335° to 550° F., and a surface tension not more than 150 percent of the surface tension of said fuel, and inspecting the exterior surfaces of said system for the purpose of detecting leaks therein.

5. A method of safely detecting leaks in a fuel system which comprises, in combination, the steps of introducing in said system in lieu of the fuel normally contained in said system an essentially odorless liquid mixture of branched chain hydrocarbons having a minimum flash point of 100° F., a boiling range of 335° to 550° F., and a surface tension not greater than 200 percent of the surface tension of said fuel, and containing minor but effective amounts of an odoriferous agent, and inspecting the exterior surfaces of said system for the purpose of detecting leaks therein.

6. A method of safely detecting leaks in a fuel system which comprises, in combination, the steps of introducing in said system in lieu of the fuel normally contained in said system an essentially odorless liquid mixture of branched chain hydrocarbons having a minimum flash point of 100° F., a boiling range of 335° to 550° F., and a surface tension not greater than 200 percent of the surface tension of said fuel, and containing minor but effective amounts of an oil-soluble mercaptan, and inspecting the exterior surfaces of said system for the purpose of detecting leaks therein.

7. A method of safely detecting leaks in a fuel system which comprises, in combination, the steps of introducing in said system in lieu of the fuel normally contained in said system an essentially odorless liquid mixture of branched chain hydrocarbons having a minimum flash point of 100° F. and a boiling range of 335° to 550° F. and containing a minor but effective amount of surface active agent, and inspecting the exterior surfaces of said system for the purpose of detecting leaks therein.

8. A method of safely detecting leaks in a fuel system which comprises, in combination, the steps of introducing in said system in lieu of the fuel normally conained in said system an essentially odorless liquid mixture of branched chain hydrocarbons having a minimum flash point of 100° F. and a boiling range of 335° to 550° F., and containing a minor but effective amount of a fluorescent agent, and inspecting the exterior surfaces of said system for the purpose of detecting leaks therein.

9. A method of safely detecting leaks in a fuel system which comprises, in combination, the steps of introducing in said system in lieu of the fuel normally contained in said system an essentially odorless liquid mixture of branched chain hydrocarbons having a minimum flash point of 100° F. and a boiling range of 335° to 550° F., and containing a minor but effective amount of surface active agent, an odoriferous agent, and a soluble fluorescent agent, and inspecting the exterior surfaces of said system for the purpose of detecting leaks therein.

10. A method of safely detecting leaks in a fuel system which comprises, in combination, the steps of introducing in said system in lieu of the fuel normally contained in said system an essentially odorless liquid mixture of branched chain hydrocarbons having a minimum flash point of 125° F., and a boiling range of 335° to 450° F. and containing a surface active agent, an odoriferous agent and a soluble fluorescent agent, and inspecting the exterior surfaces of said system for the purpose of detecting leaks therein.

11. A method of safely detecting leaks in an aircraft power plant fuel injection system and aircraft fuel tanks which comprises, in combination, the steps of withdrawing the fuel from said system and said tanks, introducing in said system and said tanks in lieu of said fuel a liquid mixture of branched chain hydrocarbons having a minimum flash point of 100° F., a boiling range of 335° to 550° F., and a surface tension not greater than 200 percent than that of said fuel, and inspecting the exterior surfaces of said system and said tanks for the purpose of detecting leaks therein.

12. A method of safely detecting leaks in a fuel system which comprises, in combination, the steps of introducing in said system in lieu of the fuel normally contained in said system an essentially odorless liquid mixture of branched chain hydrocarbons having a minimum flash point of 100° F. and a boiling range of 335° to 550° F., and containing minor but effective amounts of an odoriferous agent and a surface active agent, and inspecting the exterior surface of said system for the purpose of detecting leaks therein.

13. A method of safely detecting leaks in a fuel system which comprises, in combination, the steps of introducing in said system in lieu of the fuel normally contained in said system an essentially odorless liquid mixture of branched chain hydrocarbons having a minimum flash point of 100° F. and a boiling range of 335° to 550° F., and containing minor but effective amounts of an odoriferous agent and a fluorescent agent, and inspecting the exterior surface of said system for the purpose of detecting leaks therein.

14. A method of safely detecting leaks in a fuel system which comprises, in combination, the steps of introducing in said system in lieu of the fuel normally contained in said system an essentially odorless liquid mixture of branched chain hydrocarbons having a minimum flash point of 100° F. and a boiling range of 335° to 550° F., containing minor but effective amounts of fluorescent agent and a surface active agent, and inspecting the exterior surface of said system for the purpose of detecting leaks therein.

15. A safety leak detector liquid adapted to indicate leaks in a container normally containing a liquid when said leak detector liquid is substituted therefor, said leak detector liquid comprising a liquid mixture of branched chain hydrocarbons having a minimum flash point of 100° F., a boiling range of 335° to 550° F., and a surface tension not greater than 200 percent of the surface tension of said liquid normally contained within said container, said leak detector liquid containing a small but effective amount of at least one of the following supplemental leak detecting aids: a surface active agent, an odoriferous agent, and a fluorescent agent, and combinations thereof.

16. A safety leak detector liquid adapted to indicate leaks in a container normally containing fuel when said leak detector liquid is substituted therefor, said leak detector liquid comprising a liquid mixture of branched chain hydrocarbons having a minimum flash point of 100° F., a boiling range of 335° to 550° F., and a surface tension not greater than 150 percent of the surface tension of said fuel, said leak detector liquid containing a small but effective amount of at least one of the following supplemental leak detecting aids: a surface active agent, an odoriferous agent, and a fluorescent agent, and combinations thereof.

17. A safety leak detector liquid adapted to indicate leaks in a container normally containing fuel when said leak detector liquid is substituted therefor, said leak detector liquid comprising a liquid mixture of branched chain hydrocarbons having a minimum flash point of 100° F., a boiling range of 335° to 550° F., and a surface tension not greater than 200 percent of the surface tension of said fuel, said leak detector liquid containing a small but effective amount of at least one of the following supplemental leak detecting aids: a surface active agent, an odoriferous agent, and a fluorescent agent, and combinations thereof.

18. A safety leak detector liquid adapted to indicate leaks in a container normally containing fuel when said leak detector liquid is substituted therefor, said leak detector liquid comprising a liquid mixture of branched chain hydrocarbons having a minimum flash point of 100° F., a boiling range of 335° to 550° F., and a surface tension not greater than 200 percent of the surface tension of said fuel, said leak detector liquid containing a minor but effective amount of an odoriferous agent.

19. A safety leak detector liquid adapted to indicate leaks in a container normally containing fuel when said leak detector liquid is substituted therefor, said leak detector liquid comprising a liquid mixture of branched chain hydrocarbons having a minimum flash point of 100° F., a boiling range of 335° to 550° F., and a surface tension not greater than 200 percent of the surface tension of said fuel, said leak detector liquid containing a minor but effective amount of a soluble fluorescent agent.

20. A safety leak detector liquid adapted to indicate leaks in a container normally containing fuel when said leak detector liquid is substituted therefor, said leak detector liquid comprising a liquid mixture of branched chain hydrocarbons having a minimum flash point of 100° F., a boiling range of 335° to 550° F., and a surface active agent.

21. A safety leak detector liquid adapted to indicate leaks in a container normally containing fuel when said leak detector liquid is substituted therefor, said leak detector liquid comprising a liquid mixture of branched chain hydrocarbons having a minimum flash point of 100° F., a boiling range of 335° to 550° F., minor but effective amounts of a surface active agent, an odoriferous agent, and a fluorescent agent.

22. A safety leak detector liquid adapted to indicate leaks in a container normally containing fuel when said leak detector liquid is substituted therefor, said leak detector liquid comprising a liquid mixture of branched chain hydrocarbons having a minimum flash point of 100° F., a boiling range of 335° to 550° F., minor but effective amounts of an odoriferous agent and a surface active agent.

23. A safety leak detector liquid adapted to indicate leaks in a container normally containing fuel when said leak detector liquid is substituted therefor, said leak detector liquid comprising a liquid mixture of branched chain hydrocarbons having a minimum flash point of 100° F., a boiling range of 335° to 550° F., minor but effective amounts of an odoriferous agent and a fluorescent agent.

24. A safety leak detector liquid adapted to indicate leaks in a container normally containing fuel when said leak detector liquid is substituted therefor, said leak detector liquid comprising a liquid mixture of branched chain hydrocarbons having a minimum flash point of 100° F., a boiling range of 335° to 550° F., minor but effective amounts of a fluorescent agent and a surface active agent.

References Cited in the file of this patent

UNITED STATES PATENTS

| | | |
|---|---|---|
| 409,013 | Clark | Aug. 13, 1889 |
| 417,210 | Meriam | Dec. 10, 1889 |
| 1,090,737 | McDonald | Mar. 17, 1914 |
| 1,987,309 | Orelup | Jan. 8, 1935 |
| 2,013,203 | Davis | Sept. 3, 1935 |
| 2,094,270 | Hampton et al. | Sept. 28, 1937 |
| 2,191,114 | Neresheimer | Feb. 20, 1940 |
| 2,393,996 | Layton | Feb. 5, 1946 |
| 2,405,078 | Ward | July 30, 1946 |
| 2,472,522 | DeForest | June 7, 1949 |
| 2,478,951 | Stokey | Aug. 16, 1949 |
| 2,625,518 | Pollock | Jan. 13, 1953 |

OTHER REFERENCES

Publication, "Warning Agents for Fuel Gases," U.S. Dept. of Commerce, Bureau of Mines, 1931, pages 16, 17, copy in Div. 59, Class 48—195.

Aviation Gasoline Manufacture, by Matthew Van Winkle, published 1944 by McGraw-Hill, New York, New York, copy in Div. 64.